Jan. 8, 1924.

1,479,986

D. F. FESLER

LUBRICATING DEVICE

Original Filed Nov. 18, 1918

Inventor:
Douglas F. Fesler

Patented Jan. 8, 1924.

1,479,986

UNITED STATES PATENT OFFICE.

DOUGLAS F. FESLER, OF CHICAGO, ILLINOIS, ASSIGNOR TO THE BASSICK MANUFACTURING COMPANY, A CORPORATION OF DELAWARE.

LUBRICATING DEVICE.

Original application filed November 18, 1918, Serial No. 262,930. Divided and this application filed May 28, 1920. Serial No. 384,928.

*To all whom it may concern:*

Be it known that I, DOUGLAS F. FESLER, a citizen of the United States, residing at Chicago, in the county of Cook and State of Illinois, have invented a certain new and useful Improvement in Lubricating Devices, of which the following is a full, clear, concise, and exact description, reference being had to the accompanying drawings, forming a part of this specification.

My invention relates to improvements in a lubricating device, and is especially concerned with means for supplying lubricant under pressure to bearings or other surfaces to be lubricated. My invention comprises means whereby lubricant under high pressure can be initially supplied to the surfaces to be lubricated and other means for thereafter supplying lubricant to said surfaces at a considerably reduced pressure.

The objects of my invention are:

1st: To provide apparatus for performing the above functions, comprising in general a grease cup having a plunger therein, a spring confined between one end of the grease cup and the plunger, means for supplying lubricant under pressure to the space between the other side of the plunger and the opposite end of the grease cup, and means for conducting lubricant from said space to the bearing or surface to be lubricated, the means for supplying lubricant to said space under pressure comprising a grease gun or compressor, such as that disclosed in my co-pending application, Serial No. 262,930, filed November 18, 1918, of which this application constitutes a division, and which comprises a discharge nozzle and means for detachably connecting the discharge nozzle of the grease gun with the grease cup.

2nd: To provide a system of the character described in which means is provided for supporting the plunger against the pressure of the lubricant when the grease cup is completely filled by lubricant under pressure, so that additional pressure can be exerted upon the lubricant in order to force it into the bearing with which the grease cup is connected under an extremely high pressure, whereby a supply of lubricant is insured to every point of contact of the bearing.

3rd: To provide a grease cup of novel construction forming a part of the above-described system which is simple in construction and economical to manufacture; and 4th: To provide a grease cup of the type described having means for indicating the amount of lubricant which it contains.

Other objects will appear as this description progresses, reference being had to the accompanying drawings in which Figure 1 is a central section through a lubricating device embodying my invention, portions thereof being broken away;

Throughout the several views, similar reference characters will be used to refer to similar parts.

Figure 1:
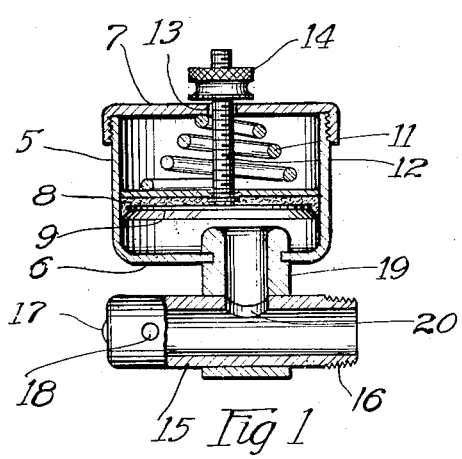
Figure 2:
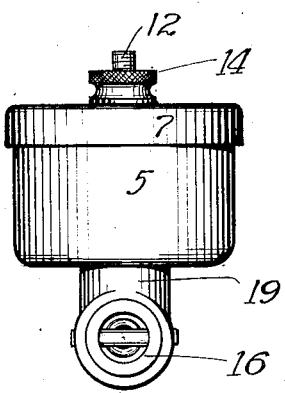
Figure 2 is a side elevation thereof.

Referring to the drawings, the reference character 5 indicates a cylindrical lubricant receiving receptacle forming the body of the grease cup, this receptacle being provided with an integral end closure 6 and a detachable closure 7. A plunger comprising the cup leather 8, the face plate 9 and the back plate or follower 10 is mounted in the lubricant receiving receptacle and is urged toward the end 6 by means of a spiral spring 11, one end of which bears against the follower 10 and the other end of which rests against the closure 7. A screw threaded rod 12 is secured centrally of the follower 10 and projects outwardly through an opening 13 in the end closure 7. The outer end of the rod 12 is provided with a nut 14.

Reference character 15 indicates a tubular member, one end of which is threaded as indicated at 16 to provide means for securing the tubular member, and consequently the grease cup, to a bearing to be lubricated. The other end of the grease cup is provided with a spring-pressed closure 17 and a pin 18, the relative relation of the closure 17, its actuating spring and the pin 18 being similar to that illustrated and described in the patent to Arthur V. Gullborg, 1,307,734 of June 24, 1919. The pin 18 constitutes means for forming a detachable connection between the tubular member 15 and the discharge conduit of a grease gun or compressor similar to that shown in my co-pending application, above referred to, or to the one shown in the aforementioned patent of Gullborg.

For establishing communication between the tubular member 15 and the lubricant receiving receptacle 5, I provide a second tubular member 19, one end of which projects through the end closure 6 of the receptacle 5 and is swedged over, as shown in Figure 1, to secure it thereto. The opposite end of the tubular member 19 is provided with a transverse bore into which the tubular member 15 is forced. The tubular member 15 is provided with a lateral opening 20 for establishing communication between the bores of the tubular members 15 and 19.

For supplying lubricant to a bearing to which my improved lubricating device is secured, the discharge conduit of a lubricator compressor or gun, such as that referred to above, is connected to the end of the tubular member 15 provided with the closure 17 and actuated to force lubricant into the tubular member 15. Usually the resistance to the passage of lubricant between the surfaces to be lubricated is sufficient to cause the lubricant to initially pass into the receptacle 5, raising the plunger until the spring 11 is completely compressed against the end closure 7, whereupon the movement of the plunger will be arrested. Upon increasing the pressure on the lubricant it will be forced between the surfaces to be lubricated. When all of the dirt contaminated lubricant has been forced from the bearing and replaced by fresh lubricant, the pressure on the lubricant in the compressor is relieved and the compressor disconnected from the grease cup. At the same time the nut 14 is screwed downwardly upon the rod 12, which then projects the maximum distance above the end closure 7, until the nut 14 rests against this end closure. Additional lubricant can be supplied to the bearing from time to time by adjusting the nut 14 outwardly on the rod 12 a distance corresponding to the amount of lubricant which it is desired to supply to the bearing at any one time. The pressure of the spring 11 upon the plunger should be sufficient to displace the lubricant from the receptacle after the bearings have once been flushed or cleaned by the initially high pressure.

Figure 3:
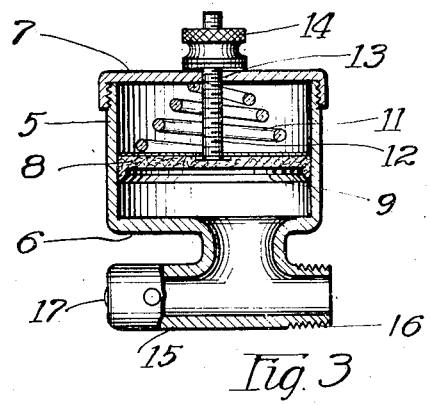
Figure 3 is a view similar to Figure 1, disclosing a modified form or embodiment of my invention.

In Figure 3, I have illustrated a modified form of my invention in which the side walls and end closure 6 of the lubricant receiving receptacle and the tubular members 15 and 19 are formed integrally with each other. It will be noted that in both forms of my invention the lubricant which is initially forced through the bearing under the pressure developed in the compressor follows a straight path through the grease cup, thereby reducing to a minimum the amount of pressure for forcing the lubricant through the grease cup. It will also be noted that the tubular member 15 extends transversely of the lubricant receiving receptacle and in close proximity to one end thereof, whereby it and the ends of the pin 18 are more or less protected against mechanical injury.

While I have described the details of the preferred embodiment of my invention, it is to be clearly understood that my invention is not limited to these details, but is capable of other adaptations and modifications within the spirit and scope of the appended claims.

Having thus described my invention, what I claim is:

1. A lubricating device comprising a lubricant receptacle having opposed end members, a plunger mounted in said receptacle, a spring confined between one end member and said plunger, a tubular member having means at one end for securing it to a bearing to be lubricated, the other end of said tubular member being provided with an inwardly opening closure and means for making a detachable connection with the discharge conduit of a lubricant compressor, and means for establishing communication between said tubular member and the space between said plunger and the opposite end member of said receptacle, the said tubular member extending transversely of said receptacle, and in close proximity to said last mentioned end member.

2. A lubricating device comprising a lubricant receptacle having opposed end members, a plunger mounted in said receptacle, means for urging said plunger toward one end member, a tubular member having means at one end for securing it to a bearing to be lubricated, the other end of said tubular member being provided with an inwardly opening closure and means for making a detachable connection with the discharge conduit of a lubricant compressor, and means for establishing communication between said tubular member and the space between said plunger and the opposite end member of said receptacle, the said tubular member extending transversely of said receptacle.

3. A lubricating device comprising a lubricant receptacle, means for expelling lubricant from said receptacle, a tubular member extending transversely of said receptacle and having means at one end for securing said tubular member to a bearing to be lubricated, the other end of said tubular member being provided with a closure and means for making a detachable connection with a lubricant compresser, and means for establishing communication between said tubular member and said receptacle.

4. The combination with a cylinder of a plunger slidable in said cylinder, a spiral spring between said plunger and one end of said cylinder. means, for conducting lubricant from the other end of said cylinder comprising a tubular member, means for supplying lubricant to said cylinder comprising a second tubular member communicating with said first-named tubular member and provided with a spring-pressed closure, the said second tubular member comprising means for making quick detachable connection with the discharge conduit of a lubricant compressor, a screw-threaded rod connected with said plunger and projecting through its first mentioned end, and a nut threaded on said rod outside of said cylinder whereby the inward movement of said plunger can be controlled and automatically limited.

5. The combination with a cylinder of a plunger slidable in said cylinder, a spring between said plunger and one end of said cylinder, means for conducting lubricant from the other end of said cylinder comprising a tubular member, means for supplying lubricant to said cylinder comprising a second tubular member communicating with said first-named tubular member and provided with a spring-pressed closure, the said second tubular member comprising means for making quick detachable connection with the discharge conduit of a lubricant compressor, and adjustable means for permitting a predetermined gradual inward movement of said plunger under the influence of said spring.

6. The combination with a cylinder of a plunger slidable in said cylinder, a spring between said plunger and one end of said cylinder, means for conducting lubricant from the other end of said cylinder comprising a tubular member, means for supplying lubricant to said cylinder comprising means for making quick detachable connection with the discharge conduit of a lubricant compressor, and adjustable means for permitting a predetermined gradual inward movement of said plunger under the influence of said spring.

7. The combination with a cylinder of a plunger slidable in said cylinder, a spring between said plunger and one end of said cylinder, means for conducting lubricant from the other end of said cylinder comprising a tubular member, means for supplying lubricant to said cylinder, and adjustable means for permitting a predetermined gradual inward movement of said plunger under the influence of said spring.

In witness whereof, I hereunto subscribe my name this 21st day of May, 1920.

DOUGLAS F. FESLER.

Witnesses:
ALBIN C. AHLBERG,
ANDREW WINTERCORN.